(12) United States Patent
Kransmo et al.

(10) Patent No.: US 6,487,404 B1
(45) Date of Patent: Nov. 26, 2002

(54) AUTOMATED RADIO NETWORK TREND DETECTION

(75) Inventors: Jan Kransmo, Plano, TX (US); Amie Larson, Linkoping (SE); Charles M. Feltner, Plano, TX (US); Shahrokh Amirijoo, Sollentuna (SE)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/475,506

(22) Filed: Dec. 30, 1999

(51) Int. Cl.$^7$ .................................................. H04Q 7/34
(52) U.S. Cl. ........................ 455/423; 455/433; 455/424; 455/425; 455/446; 455/422; 379/1.01; 379/14; 379/15.01
(58) Field of Search ................................ 455/436, 423, 455/433, 422, 403, 412, 67.1, 432, 445, 507, 524, 550, 552, 554, 555, 560, 424, 425, 446; 379/1.01, 14, 9.04, 15.01; 707/200, 203, 2, 3, 4, 6; 709/223

(56) References Cited

U.S. PATENT DOCUMENTS

| | | | | | |
|---|---|---|---|---|---|
| 5,727,057 | A | * | 3/1998 | Emery et al. | 455/422 |
| 6,108,669 | A | * | 8/2000 | Dalenberg et al. | 379/14 |
| 6,134,544 | A | * | 10/2000 | Glitho et al. | 455/422 |
| 6,252,852 | B1 | * | 6/2001 | Rowles et al. | 455/423 |
| 6,259,907 | B1 | * | 7/2001 | Bellamy, Jr. et al. | 455/422 |

* cited by examiner

Primary Examiner—William Trost
Assistant Examiner—Keith Ferguson

(57) ABSTRACT

A system and method of detecting radio network trends in a telecommunications network. A data mining tool (52) is provided and adapted to search through the various operations and maintenance database systems belonging to one or more communications network(s) (60). The data mining tool searches through the databases to find correlations and dependencies among the parameters of the data collected and stored in the database systems. The correlations and dependencies found are then reported for further analysis which can, in turn, be used in optimization, maintenance and trouble shooting of the network.

18 Claims, 2 Drawing Sheets

AUTOMATED RADIO NETWORK TREND DETECTION

TECHNICAL FIELD

This invention relates in general to wireless telecommunications networks and applications and, in particular, to a method and system of detecting trends in a telecommunications network. More particularly, the invention relates to methods of accessing, searching and correlating data stored in the operations and maintenance databases of a variety of network systems for performing optimization, maintenance and troubleshooting on a communications network.

BACKGROUND OF THE INVENTION

Without limiting the scope of the invention, its background is described in connection with detecting trends in a telecommunications network utilizing a data mining tool, as an example.

Present-day mobile telephony has spurred rapid technological advances in both wireless and wireline communications. The wireless industry, in particular, is a rapidly growing industry, with advances, improvements, and technological breakthroughs occurring on an almost daily basis. Many mobile or wireless telecommunications systems, among them the European GSM-system and third generation systems (e.g., cdma2000), have passed through several advancements and development phases, and system designers are now concentrating on further improvements to such systems, including system refinements and the introduction of optional subscriber services.

Most telecommunication networks include a Switching System (SS) and a Base Station System (BSS). Each of these systems contain a number of functional units which process information and carry out operations of a functional telecommunications network. The functional units themselves may be implemented utilizing various telecommunication hardware devices.

Communicably coupled to the SS and BSC for each telecommunications network is an Operations and Maintenance Center (OMC). That is, the SS and BSC contain equipment used to connect the OMC to the network. Those skilled in the art will appreciate that OMC may be referred to as OSS in a Global System for Mobile (GSM) Communication system, or RANOS in a WCDMA network system. Those skilled in the art will also appreciate that each vendor supports a standard database structure for their own database systems. The OMC database systems of the various networks are configured to collect, maintain and store data parameters indicative of the performance of a corresponding network. Data parameters include, for example, BTS power levels, timing advance values, Radio Disturbance Recordings (RDR), group call cell positioning, and location services.

Various methods and systems currently exist for detecting trends among data parameters within wireless telecommunication networks. One of the most widely utilized methods involves manually searching Operations and Maintenance (O&M) database systems. The results from the various manual searches are then analyzed to find correlations or dependencies between the data parameters. Such tools are helpful in detecting trends in a network in order to perform optimization, maintenance and troubleshooting on the network. However, taken together, the manual search results are often inaccurate because of the dependence on skilled personnel. That is, the chances for human error are increased with this method. Furthermore, the problem becomes even more complex in a multi-vendor network with a plurality of O&M database systems in the network. In such a situation, skilled personnel are required and time consumption becomes a factor in manually searching all databases.

Vendor specific tools also exist, such as vendor specific network optimization products. This method is, however, vendor dependent. For example, in a multi-vendor system where a service provider may have 1,000 cells and another service provider may have 1,000 cells, and so on, data parameters of the various cells may not be correlated. That is, it is not possible to analyze the configuration of all cells to see if they are equal. Therefore, in order to verify that cell configurations in a different system with a plurality of vendors are equal, a method is needed which is vendor independent.

Another method utilized to detect trends or patterns among data involves utilizing Bots. The word "Bot" is short for robot, which is derived from the Czech word robota meaning work. A Bot is a software tool for digging through data. In application, a Bot is given directions and returns results. In the Internet industry, there are at least three well known types of Bots: Indexing Bots, Shopping Bots and Data Mining Bots. Data Mining Bots is the process of finding patterns in enormous amounts of data. Because data mining often requires a series of searches, Bots can save labor as they persist in a search, refining as they go along. Data mining, for example, can help retail companies find customers with common interests.

In short, the prior art methods of detecting trends in a network are generally unsuitable for today's modern wireless network. What is needed is a vendor independent and automated method of detecting trends in a network that utilizes a data mining tool, or bots. A means of accessing vendor database systems and searching for correlations and dependencies among an enormous amount of telecommunications data efficiently is needed in order to consume less time and allow for accuracy. That is, obtaining accurate patterns found among data will assist in optimization, maintenance and troubleshooting of networks.

SUMMARY OF THE INVENTION

The present invention provides a method and system for detecting radio network trends in a telecommunications network. With the present invention, the network operator, for example, can identify correlations and dependencies which can then be used in optimizing, maintaining and troubleshooting the network.

Disclosed in one embodiment is a method of detecting radio network trends in a telecommunications network. The method comprises the step of accessing the operations and maintenance databases of the network via a data mining tool. Initially, the scope of the search to be accomplished by the data mining tool via parameters of the databases to be searched is specified.

The method also comprises the step of searching through the databases to find correlations and dependencies. That is, the data mining tool parses through the databases in its attempt to recognize patterns across the databases searched. If such patterns are identified, then the patterns are correlated within a database and across all databases in order to generate an output. Furthermore, the data mining tool is equipped to parse through standard formatted databases, as well as System Query Language (SQL) type structures in order to retrieve and maintain data arranged within.

The method further comprises the step of reporting the correlations and dependencies. Once the information sought has been retrieved, the data mining tool is configured to translate the vendor information found in the database systems to generic form. An output is then generated for a network engineer, for example, to use in determining areas of improvement or for analyzing the performance of the corresponding networks.

Technical advantages of the present invention include an automated method of detecting trends in the network compared to the manual searching approach presently utilized. Correlations and dependencies are identified in the shortest amount of time and by use of a data mining tool currently used in the Internet industry.

Other technical advantages include more accurate identification and analysis of network trends and patterns. The method and system of the present invention utilize data contained in vendor O&M database systems. As such, the trend analysis takes into account all data in one or more database systems within and across the network due to vendor independence.

BRIEF DESCRIPTION OF THE DRAWINGS

For a more complete understanding of the present invention, including its features and advantages, reference is made to the following detailed description of the invention, taken in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
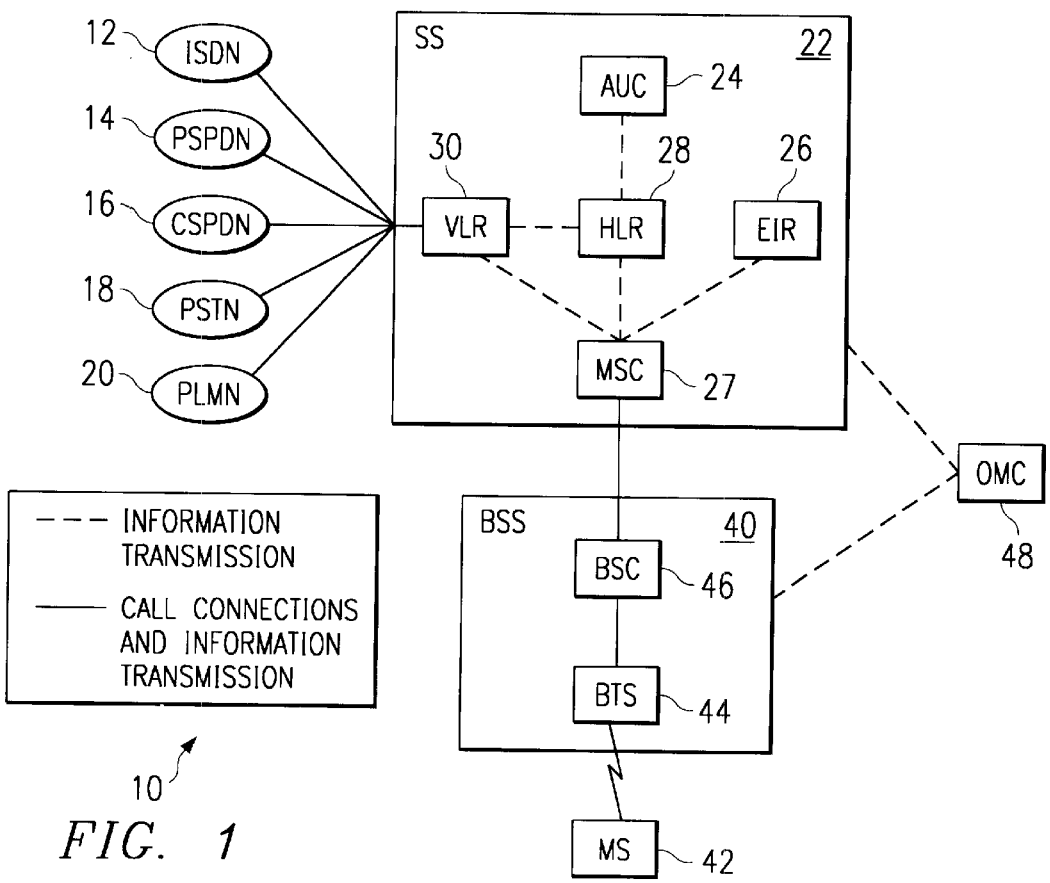
FIG. 1 depicts a telecommunications network in which a preferred embodiment of the present invention may be implemented.

To better understand the invention, reference is made to FIG. 1, wherein a diagram of a telecommunications network, denoted generally as 10, in which a preferred embodiment of the present invention may be implemented is shown. Telecommunications network 10 includes a Switching System (SS) 22 and a Base Station System (BSS) 40. Each of these systems contains a number of functional units, which process information and carry out operations of a functional telecommunications network 10. The functional units themselves may be implemented utilizing various telecommunications hardware devices.

The SS 22 includes a Visitor Location Register (VLR) 30, a Home Location Register (HLR) 28, an Authentication Center (AUC) 24, an Equipment Identity Register (EIR) 26, and a Mobile Switching Center (MSC) 27. The BSS 40 comprises a Base Station Controller (BSC) 46 and a Base Transceiver Station (BTS) 44. An Operations and Maintenance Center (OMC) 48 is connected to equipment present within SS 22 and to BSC 46. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier and the area in which the supplier stands ready to provide its service. Each cell contains a BTS 44 operating on a set of radio channels. These channels differ from the channels utilized by neighboring cells in order to avoid interference.

Each BSC 46 controls a group of BTSs 44. The BSC 46 controls well-known telecommunication functions, such as "Handover" and power control. A number of BSCs (e.g., BSC 46) are served by a MSC 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, a Packet Switched Public Data Network (PSPDN) 14.

Each unit is actively involved in carrying speech connections between the Mobile Station (MS) 42 and, for example, a subscriber in a fixed network, such as PSTN 18. Because of the extreme difficulties involved in completing an MS 42 terminated telephone call, a number of databases located within the telecommunications network keep track of the MS 42. The most important of these databases is the HLR 28. When a user subscribes to a wireless telecommunications network, such as the telecommunications network 10 depicted in FIG. 1, the user is registered within the HLR 28. The HLR 28 contains subscriber information, such as supplementary services and authentication parameters.

Data describing the location of the MS 42, such as the area (i.e., the MSC area) in which the MS 42 presently resides, is contained within the HLR 28. The MSC area represents that portion of the telecommunications network 10 covered by a single MSC 27. In order to route a call to a mobile subscriber within a telecommunications network, such as the telecommunications network 10 depicted in FIG. 1, the path through the network links to the MSC 27 in the MSC area where the subscriber is currently located. Data describing the location of the MS 42 is thus actively altered as the MS 42 moves from cell to cell within the telecommunications network 10. MS 42 sends location information, via MSC 27 and VLR 30, to an associated HLR 28, which permits MS 42 to receive calls. The AUC 24 is connected to HLR 28, and provides HLR 28 with authentication parameters and ciphering keys utilized for security purposes.

Furthermore, VLR 30 is a database that contains information regarding all mobile stations currently located in the MSC area. When MS 42 roams in a new MSC area, the VLR 30 connected to the MSC 27 in that particular area requests data about the MS 42 from HLR 28. Simultaneously, HLR 28 is provided with the location of the MSC area in which MS 42 resides. If it is later desired to make a call from MS 42, VLR 30 will have at its disposal, all the information necessary for call set-up, without being forced to interrogate HLR 28 each time a call is made. The VLR 30 thus functions as a distributed HLR 28. As such, VLR 30 also contains precise information about the location of the MS 42 in the MSC area.

If an individual subscriber within the fixed network PSTN 18 desires to make a call to a subscriber, an exchange within PSTN 18 connects the call to an MSC 27 equipped with a function commonly known as a "gateway" function. In the telecommunications arts, an MSC 27 having a "gateway" function is commonly referred to as a Gateway MSC (GMSC). The MSC 27 in telecommunications network 10 of FIG. 1 may be implemented as a GMSC. Most MSC's within GSM telecommunications networks function as a GMSC. The GMSC must find the location of the searched MS 42, which can be accomplished by interrogating the HLR 28 where the MS 42 is registered. The HLR 28 then replies with the address of the current MSC area. Thereafter, the GMSC can re-route the call to the correct MSC 27. When the call reaches that MSC 27, the VLR 30 will have additional information regarding the precise location of the MS 42. The call can then be switched through to completion.

The telecommunications network 10 depicted in FIG. 1 may be implemented as a GSM-type network. Those skilled in the art can appreciate that although the present invention is described and illustrated in the context of a GSM network standard, the present invention may also be implemented in accordance with other standards and networks, including AMPS/TMDA utilized in North and South America. The GSM network standard, as discussed herein, is merely presented for illustrative purposes only and is not a limiting feature of the present invention.

Figure 2:
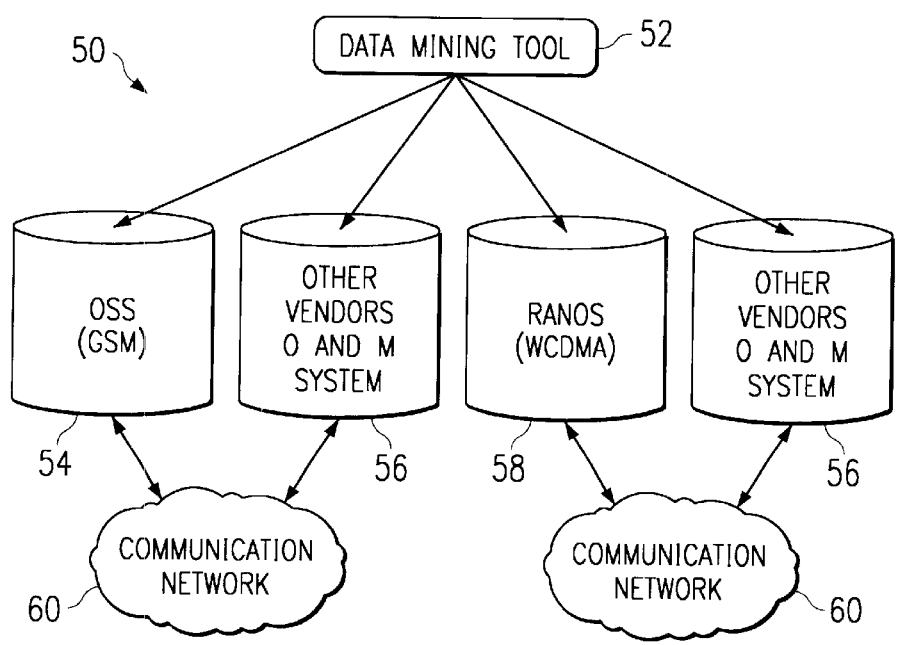
FIG. 2 is a diagram illustrating a network overview, in accordance with a preferred embodiment of the present invention.

With reference to FIG. 2, therein is shown a diagram illustrating the system for detecting radio network trends, denoted generally as 50, in accordance with a preferred embodiment of the present invention. A system of the present invention must include at least one communications networks 60, each of which can be implemented as a wireless network, or telecommunications network 10. Each of the networks 60 includes one or more O&M database systems 56. The system 50, as in FIG. 2, is seen to include an O&M database systems 56 of the various vendors could be communicably coupled with a Switching System (SS) and Base Station System (BSC). In general, the O&M database systems 56 are equipped to collect, maintain and store data parameters indicative of the performance of each of the corresponding networks 60.

The system 50 is seen to include a data mining tool 52 configured to interface with the database systems 56. As such, the data mining tool 52 is adapted to discover previously unknown relationships among the data which would identify radio network trends. The data mining tool 52, in application, is able to parse through the OSS databases 54 of a GSM network, other system databases 56, such as RANOS 58 for WCDMA, for example, and even other vendors' O&M databases like Nokia, Nortel and Siemens without having the proprietary user interface. The scope of the search (e.g., databases to parse, subset of parameters in the database, period of time) can be specified prior to launching the data mining tool 52.

In accordance with the present invention, the data mining tool 52 is further configured to recognize patterns across all database systems, as well as correlate the patterns identified within a database or across all databases in order to generate an output. The data mining tool 52 then reports its findings to be utilized in optimization, maintenance or troubleshooting of the network.

Preferably, the data mining tool 52 is automated; thus, it is able to learn from every iteration so as to refine future searches. In addition, utilization of a data mining tool 52 allows for complex problems to be solved more efficiently and negates the need for specific vendor tools. Finally, data mining tool 52 allows for searching in a standard format (e.g., SQL), which is not found in present methods of detecting trends in a telecommunications network.

Figure 3:
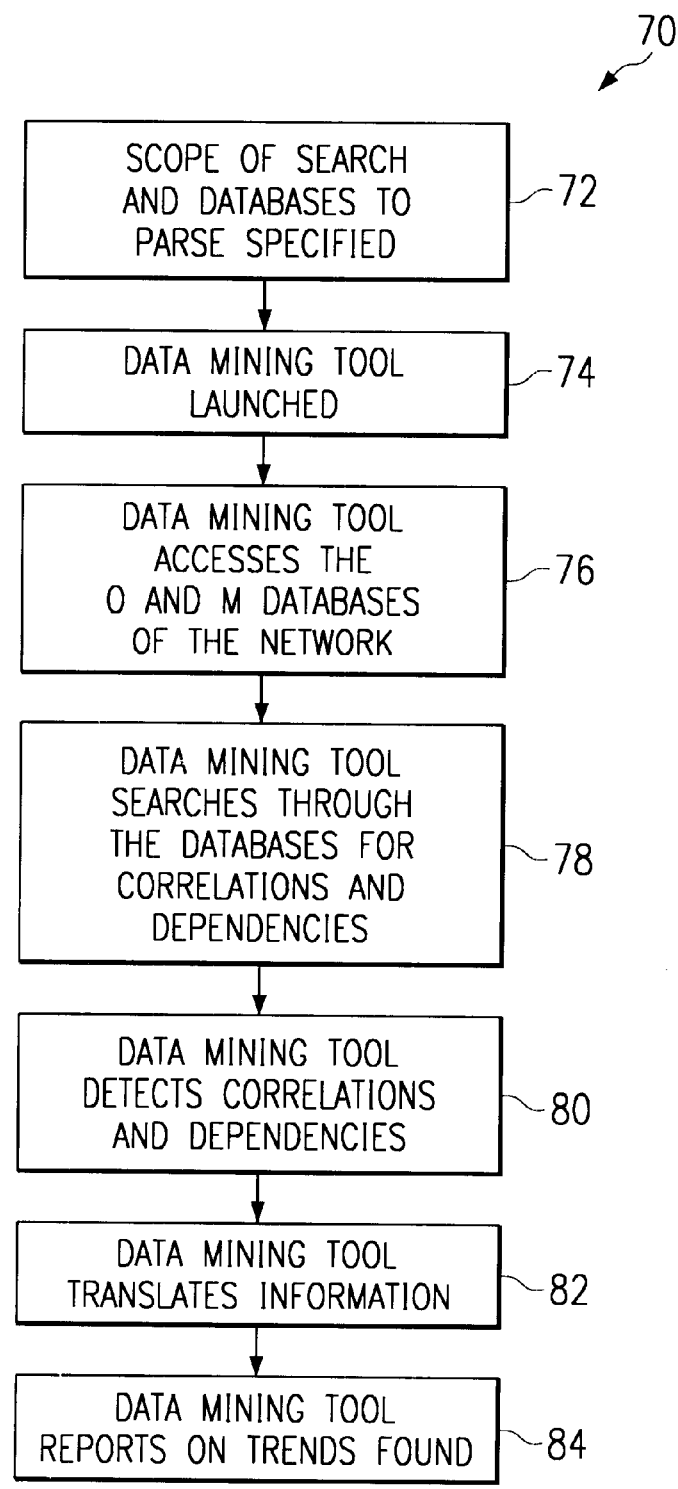
FIG. 3 is a high-level logic flow diagram illustrating process steps for implementing the method and system of the present invention, in accordance with a preferred embodiment.

FIG. 3 illustrates a high-level logic flow diagram 70 illustrating process steps for implementing the method and system of the present invention, in accordance with a preferred embodiment of the present invention. It can be appreciated by those skilled in the art that FIG. 3, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile station, or cellular telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 4. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Alternatively, a preferred embodiment of the present invention can include a program product residing in a microcomputer memory located at an MSC (e.g., MSC 27 of FIG. 1 herein). The MSC 27 controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at step 72 of FIG. 3, the scope of search and database systems to parse are specified. For example, the scope of search may be specified as a specific week in a specific cell of a radio network. In addition, this search may be specified for parsing through a set of GSM OSS databases in order to detect trends. Thereafter, as described at step 74, the data mining tool is launched with instructions. As illustrated next at step 76, the data mining tool then accesses the O&M database systems specified at step 72.

Once the data mining tool 52 as has accessed the database systems at step 76, it is then ready to begin searching at step 78. The data mining tool 52 can be configured to search through standard formatted databases wherein the data is maintained in an industry accepted format. Additionally, the data mining tool 52 can also be equipped with the functionality to search through proprietary database formats wherein the data is maintained in one of various proprietary formats for a given service provider, such as AT&T, Southwestern Bell or GTE, for example. Thus, the data mining tool 52 searches through the data parameters contained within the O&M database systems in an attempt to identify correlations and dependencies. Thereafter, as described at step 80, trends, or correlations and dependencies, are detected by the data mining tool 52. The trends detected, thus, correspond to the specified parameters indicated at step 72. Furthermore, the patterns found at step 80 are then correlated within the database in which they were detected, as well as across all database systems in order to generate an output.

Upon detection at step 80 of correlations and dependencies, the information is then retrieved and maintained by the data mining tool 52. As illustrated at step 82, the data mining tool 52 then translates the information obtained from, for example, a System Query Language (SQL) type structure, to a general format. The output is then reported at step 84 by the data mining tool 52 to an network engineer, for example, to be utilized in analysis of the network, as well as optimization, maintenance and troubleshooting. By implementing the method and system 50 of the present invention, time consuming manual searches functions are eliminated or minimized. As such, trends or dependencies are identified which may be unknown, undetected or too complex to solve within a reasonable time, thus resulting in a partial analysis of the network rather than a thorough search.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method of detecting radio network trends in a telecommunications network, comprising the steps of:

setting parameters for a data search utilizing a data mining tool;

determining which databases in said network to search for said data;

configuring said data mining tool for recognizing data patterns across all databases searched;

utilizing said data mining tool to determine previously unknown data relationships in said databases;

improving future searches by said data mining tool learning from each search iteration; and determining and reporting said network trends by utilizing said correlations, said data dependencies and said data relationships.

2. The method according to claim 1 wherein said step of setting parameters for a data search utilizing a data mining tool further comprising the step of specifying the scope of the search to be accomplished by the data mining tool via parameters of the databases to be searched.

3. The method according to claim 1 wherein configuring said data mining tool to recognize data patterns in said databases further comprises the step of parsing through standard formatted databases.

4. The method according to claim 3 further comprising the steps of retrieving and maintaining data arranged in a System Query Language (SQL) type structure.

5. The method according to claim 1 wherein said searching step further includes the step of recognizing patterns across all databases searched.

6. The method according to claim 5 further comprising the step of correlating said recognized patterns within a database and across all databases in order to generate an output.

7. The method according to claim 1 further comprising the step of parsing through a telecommunications provider's proprietary databases.

8. A system for detecting radio network trends in a telecommunications network, comprising:

a data mining tool for searching databases wherein said data mining tool further is configured for determining previously unknown data relationships in said databases and improving future searches by learning from each search iteration;

at least one database associated with said telecommunications network that collects, stores and maintains associated network performance data;

said data mining tool is further configured for recognizing patterns across all databases searched; and a program product for directing said data mining tool to determine and report said network trends utilizing said correlations and said data dependencies.

9. The system according to claim 8 wherein said database systems are coupled with a Switching System (SS) and Base Station System (BSS) of the telecommunications network.

10. The system according to claim 8 wherein said data mining tool is further adapted to correlate said data relationships within a database and across all databases to generate an output.

11. The system according to claim 8 wherein said data mining tool is further configured to parse through operations and maintenance database systems in order to find correlations and dependencies among said associated network performance data.

12. The system according to claim 8 wherein said data mining tool comprises a configuration to retrieve and maintain data arranged in a System Query Language (SQL) type structure.

13. A program product within a computer usable medium for detecting radio network trends in a telecommunications network comprising:

instructions within said computer usable medium for setting parameters for a data search utilizing a data mining tool;

instructions within said computer usable medium for determining which databases in said network to search for said data;

instructions within said computer usable medium for configuring said data mining tool to recognize data patterns across all databases searched;

instructions within said computer usable medium for utilizing said data mining tool to determine previously unknown data relationships in said data;

instructions within said computer usable medium for improving future searches by said data mining tool learning from each search iteration; and instructions within said computer usable medium for determining and reporting said network trends utilizing said correlations, said data dependencies and said data relationships.

14. The program product according to claim 13 wherein said instructions for setting parameters for a data search utilizing a data mining tool further comprises instructions for specifying the scope of the search to be accomplished by the data mining tool utilizing parameters of the databases to be searched.

15. The program product according to claim 13 wherein said instructions further comprise instructions for parsing standard formatted databases.

16. The program product according to claim 15 further comprises instructions for retrieving and maintaining data arranged in a System Query Language (SQL) type structure.

17. The program product according to claim 13 further comprises instructions for correlating said data patterns within a database and across all databases in order to generate an output.

18. The program product according to claim 13 further comprises instructions for translating data retrieved from vendor specific databases into a generic form for analysis.

\* \* \* \* \*